Patented Jan. 21, 1941

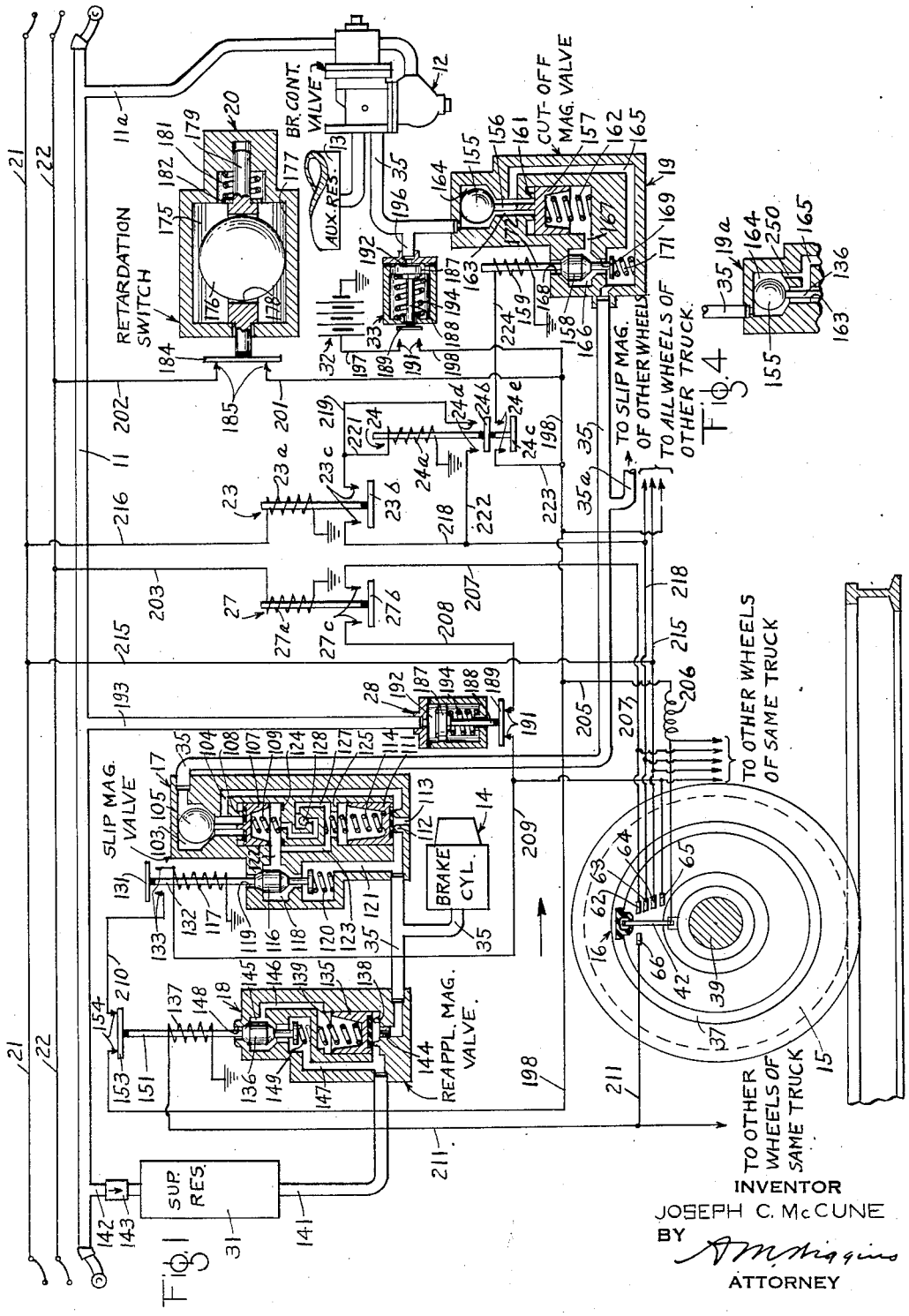

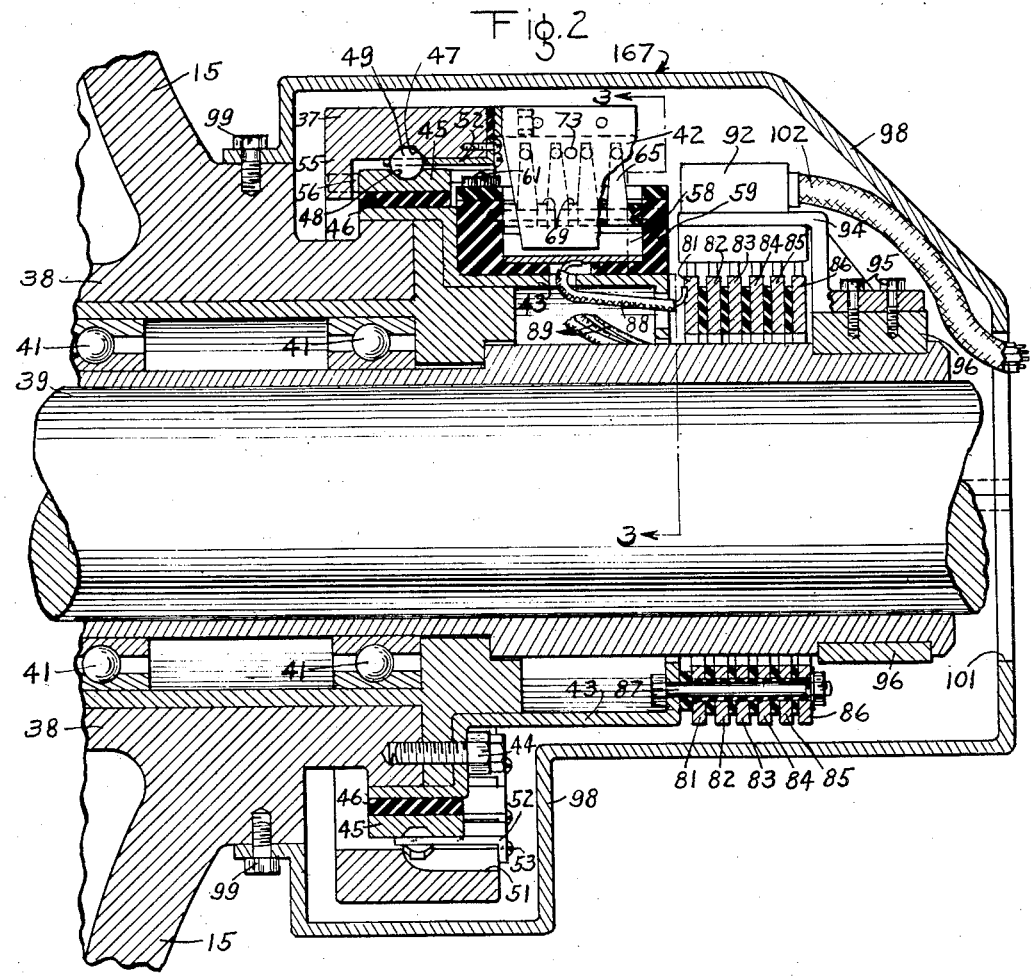
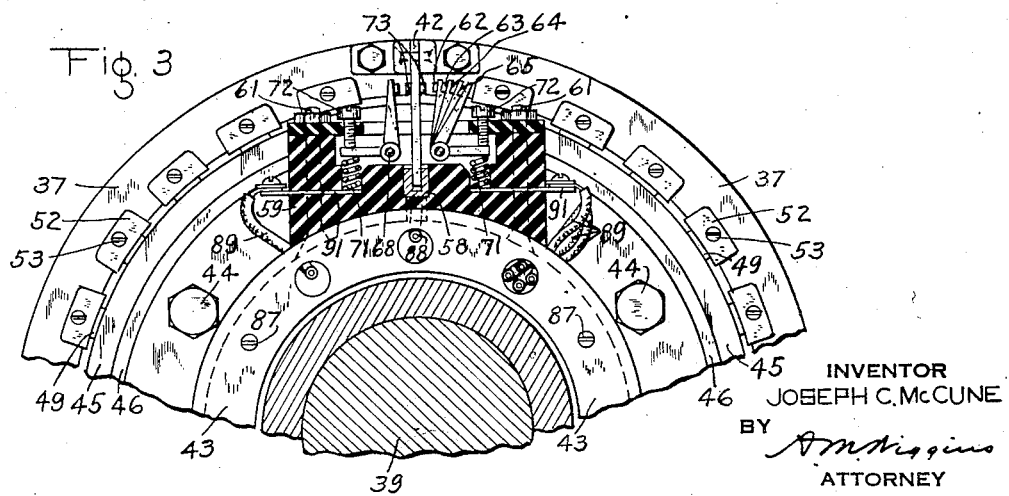

2,229,514

UNITED STATES PATENT OFFICE 2,229,514

INERTIA TYPE BRAKE CONTROL MEANS

Joseph C. McCune, Edgewood, Pa., assignor to The Westinghouse Air Brake Company, Wilmerding, Pa., a corporation of Pennsylvania Application December 31, 1938, Serial No. 248,653

10 Claims. (Cl. 303—21)

This invention relates to inertia type brake control means for vehicles such as railway cars and trains, and has particular relation to rotary inertia means associated individually with each wheel or plurality of wheels of a car or train for regulating the rate of retardation of the train to a substantially uniform rate and also effective to prevent sliding of the individual wheels in the event that they begin to slip.

In my prior Patent 2,132,959 and my prior copending application Serial No. 248,654 filed December 31, 1938, brake control equipments are disclosed including rotary inertia devices associated with the individual wheels or wheel axles of a car or train and effective to regulate and control the brakes on the train so as to cause a substantially uniform rate of retardation and also operative in the event that an individual wheel slips for preventing the sliding of the wheel. These equipments are adapted primarily to the control of brakes employing the usual metallic or cast iron brake shoes adapted to frictionally engage the rim or tread of the car wheels. As is well known, the coefficient of friction of metallic brake shoes increases as the speed of the rotation of the car wheel decreases, it thus being essential that the brake cylinder pressure be reduced as the speed of the car or train reduces in order to maintain a substantially uniform rate of retardation of the car or train.

The brake control equipment constituting my present invention is adapted to be employed in connection with brake equipments including brake shoes or the equivalent thereof of a material such that the coefficient of friction between the shoes and the rim or other braking surface of the car wheel diminishes or fades with the continued application of the brakes. Brake shoes having a friction surface of composition material, such as fiber or molded material, possess this so-called "friction-fading" characteristic. The brake control equipment constituting my present invention is accordingly adapted to the peculiar requirements of brake devices having a friction-fading characteristic and functions automatically to compensate for the reduction in the coefficient of friction of brake shoes or other rubbing parts of the brake devices, in such manner as to cause the car or train to be retarded at a substantially constant or uniform rate of retardation.

My proposed brake control equipment is furthermore adapted to be applied to cars having individually rotatable wheels. It will be appreciated that since the weight of an individual car wheel is a fraction of the weight of a pair of car wheels fixed to an axle, that the individually rotatable car wheel will decelerate rotatively toward a locked-wheel or sliding condition, once it begins to slip, at a much faster rate than in the case of a pair of car wheels connected by an axle. In order to prevent a car wheel of the individually rotatable type from attaining a locked-wheel or sliding condition once it begins to slip, it is essential that exceedingly sensitive means be provided for rapidly releasing the brakes on the slipping wheel substantially at the instant that they begin to slip. This is particularly true when the car wheel is rotating at low speed. The brake control equipment constituting my present invention accordingly includes an arrangement for differentiating between the rotative deceleration of the car wheels at a high rate without slipping and the rotative deceleration of the car wheels at a low rate while slipping. More specifically, my proposed brake control equipment includes a device responsive to the retardation of the car or train for causing the rotary inertia devices associated with the individual car wheels to operate at a relatively low rate of rotative deceleration to prevent sliding of the car wheels when the rate of retardation of the car or train is less than a certain rate and to cause the rotary inertia devices associated with the individual car wheels to operate only at a much higher rate of deceleration to prevent sliding of the car wheels when the rate of retardation of the train exceeds the certain rate.

It is accordingly an object of my invention to provide a brake control equipment adapted to be employed in connection with brake devices having cooperating friction elements possessing friction-fading characteristics and adapted to function automatically to compensate for the fading coefficient of friction of the rubbing parts of the brake devices and thereby so regulate the application of the brakes as to cause a substantially uniform rate of retardation of the car or train to be maintained.

Another object of my invention is to provide a brake control arrangement including rotary inertia devices associated individually with each car wheel and a device responsive to the rate of retardation of the car or train, adapted so that when the retardation of the car or train is less than a certain rate, the rotary inertia devices are responsive to a certain low rate of rotative deceleration of the car wheels to guard against sliding of the car wheels and so that when the rate of retardation of the car or train exceeds the certain rate, the rotary inertia devices are operatively sensitive to a higher rate of rotative deceleration to guard against sliding of the car wheels.

The above objects and other objects of my invention which will be made apparent hereinafter are obtained by means of an illustrative brake control equipment subsequently to be described and shown in the accompanying drawings wherein Fig. 1 is a diagrammatic simplified arrangement embodying my invention, Fig. 2 is a fragmental vertical sectional view showing an individually rotatable car wheel and the details of a rotary inertia device associated therewith, Fig. 3 is a fragmental sectional view taken on the line 3—3 of Fig. 2, showing further details of the rotary inertia devices, and Fig. 4 is a fragmental sectional view showing a modification of the cut-off magnet valve illustrated in Fig. 1.

Brief Description of Equipment

Referring to Fig. 1, the brake control equipment shown includes that for a single car, it being understood that that for other cars of the train substantially duplicates that illustrated. The brake control equipment shown in Fig. 1 comprises a conventional automatic air brake equipment including a brake pipe 11 extending from car to car throughout the train, a brake controlling valve device 12, illustrated as the familiar triple valve, an auxiliary reservoir 13 and a brake cylinder 14.

For simplicity, only one car wheel 15 is shown but it should be understood that a plurality of wheels are provided for the car mounted in a plurality of wheel trucks. For simplicity, only one brake cylinder 14 is shown in associated relation with the car wheel 15 for operating the wheel brakes. It should be understood however that a plurality of brake cylinders connected in parallel relation may be provided for each wheel truck, each brake cylinder being effective to operate the brakes of an associated wheel or plurality of wheels.

A rotary inertia device 16, diagrammatically indicated in Fig. 1 and shown in detail in Figs. 2 and 3, is provided in associated relation with each car wheel 15, which rotary inertia device is operatively responsive to the rate of rotative deceleration or acceleration of the individual car wheel with which it is associated. The rotary inertia devices 16 are effective to control the operation of a slip magnet valve device 17, a reapplication magnet valve device 18 and a cut-off magnet valve device 19.

Extending from car to car throughout the train are a pair of train wires 21 and 22, the wire 21 being hereafter called the synchronizing wire and the wire 22 being called the retardation wire.

The synchronizing wire 21 is energized under the control of the rotary inertia devices 16; and a relay 23, hereinafter called the synchronizing relay, is operatively controlled by energization and deenergization of the synchronizing wire to in turn control a relay 24, hereinafter called the "stick" relay, which in turn controls the operation of the cut-off magnet valve 19.

The retardation wire 22 is energized and deenergized under the control of a switch device 26 operatively responsive to the rate of retardation of the car or train and hereinafter called the retardation switch; and a relay 27, hereinafter called the retardation relay, is operatively controlled by energization and deenergization of the retardation wire to modify operation of the rotary inertia device 16 according to the operation of the retardation switch 26 in the control exercised by the rotary inertia devices over the slip magnet valve 17.

A pressure switch 28, controlled by the pressure in the brake pipe and hereinafter called the emergency protection switch is provided for a purpose to be hereinafter made apparent.

Associated with the reapplication magnet valve 18 is a supply reservoir 31 from which fluid under pressure is supplied to the brake cylinder 14 under the control of the reapplication magnet valve 18 in the manner to be hereinafter described. Additional equipment includes a source of electrical energy, such as the storage battery 32, and a pressure switch 33 associated therewith for preventing the supply of current from the battery 32 except during an application of the brakes.

Detailed Description of Equipment

The various parts of the equipment above briefly mentioned will now be considered and described in detail. Brake pipe 11 is normally charged to a given pressure, such as ninety pounds per square inch, in the conventional manner from a suitable source of supply as under the control of standard brake valve of the automatic type, not shown. As is well understood by those skilled in the art, the automatic brake valve is manually operated and includes an operating handle which is adapted to be moved out of a normal release position to a service application position, a lap position, or an emergency position. When the brake valve handle is shifted to a service application position, the pressure in the brake pipe 11 is reduced at a service rate and when the handle is shifted to a lap position further reduction of the pressure in the brake pipe ceases. When the brake valve handle is shifted to an emergency position, the pressure in the brake pipe 11 is reduced at an emergency rate.

The brake controlling valve device 12 is illustrated as the standard triple valve and should, therefore, require no description since the construction and operation of the triple valve is well known. Briefly however, the triple valve 12 has a piston chamber which is constantly connected to the brake pipe 11 through a branch pipe 11a and the piston of the triple valve is effective in response to the normal pressure in the brake pipe to condition the slide valves of the triple valve so as to effect release of fluid under pressure from the brake cylinder supply pipe 35 and the charging of the auxiliary reservoir 13 to the pressure established in the brake pipe. Upon a service reduction of the pressure in the brake pipe, the operating piston of the triple valve responds to the reduction of pressure acting thereon to shift the slide valves of the triple valve so as to establish communication through which fluid under pressure is supplied from the auxiliary reservoir 13 to the brake cylinder supply pipe 35.

As is well understood, the triple valve 12 is operative to establish a pressure in the brake cylinder supply pipe 35 which corresponds to the amount of reduction of the pressure in the brake pipe, the triple valve automatically lapping off the supply pressure from the auxiliary reservoir.

When the pressure in the brake pipe 11 is reduced at an emergency rate, the triple valve operates to supply fluid under pressure from the auxiliary reservoir to the brake cylinder pipe 35 at an emergency rate. Furthermore, the triple valve does not lap the supply communication from the auxiliary reservoir and a maximum pressure is established in the brake cylinder pipe 35 corresponding to the pressure of equalization between the auxiliary reservoir and the connected brake cylinder pipe 35. For simplicity, the brake cylinder supply pipe 35 will be conisdered hereinafter as extending to the brake cylinder 14, the cut-off magnet valve 19 and the slip magnet valve 17 being interposed in the brake cylinder pipe 35 and operative to control the brake cylinder pressure in the manner to be hereinafter described.

The rotary inertia devices 16 associated with each individual car wheel 15 may be of any suitable construction but are illustrated in Figs. 2 and 3 as one of the types described and claimed in my pending application Serial No. 255,649, filed February 10, 1939. Referring to Figs. 2 and 3, the rotary inertia device 16 may comprise a rotary inertia element or ring 37, hereinafter referred to as the inertia ring, rotatably mounted on the inner end of the hub portion 38 of the car wheel 15. The car wheels 15 are suitably mounted for individual and separate rotation, as for example in the manner shown, on a non-rotatable axle 39 fixed in the frame of the wheel truck, ball-bearing members 41 being interposed in the central opening in the hub portion 38 of the wheels.

The inertia ring 37 is adapted to be driven by rotation of a car wheel through a flexible yielding connection in the form of a leaf spring 42 which is fixed by an insulating connection at the outer end to the inertia ring and at the inner end to a tubular member 43 which is secured as by screws 44 to the inner end of the hub portion 38 of car wheel 15.

The tubular member 43 has a portion at one end which surrounds the inner end of the hub portion 38 of the car wheels and secured to this portion of the tubular member 43 is a bearing ring 45. Interposed between the tubular member 43 and the bearing ring 45 is an annular cushioning ring 46 of suitable material such as rubber, the cushioning ring 46 being bonded on the outer surface thereof to the bearing ring 45 and on the inner surface thereof to the tubular member 43 so that the bearing ring 45 is securely fastened to the tubular member 43.

The bearing ring 45 and the inertia ring 37 are provided with complementary peripheral grooves 48 and 47, respectively, the grooves being preferably of semi-hexagonal contour in cross-section and containing a plurality of ball bearings 49 whereby the inertia ring 37 is rotatably supported on and interlocked with the inner end of the hub portion 38 of the car wheel. The ball-bearings 49 are introduced into the complementary grooves 47 and 48 through a transverse slot 51 in the inertia ring 37 and held individually in fixed peripheral positions in spaced relation to each other by forked members 52 secured as by screws 53 to one edge of the inertia ring and extending into the space between the inertia ring and the bearing ring in a manner to straddle the corresponding ball-bearing 49.

The inertia ring 37 is provided with a lug 55 that extends radially inward between a pair of spaced lugs 56, only one of which is indicated in Fig. 2, formed on or fixed to the bearing ring 45. When the car wheel 15 is rotating at a uniform speed, the flexible leaf spring 42 holds the inertia ring 37 in a certain normal position in which the lug 55 is substantially midway between the lugs 56. Upon acceleration or deceleration of the car wheel 15, the inertia ring 37 tends to lag behind or under-speed the car wheel or to over-speed the car wheel respectively and thus shifts rotatively with respect to the car wheel 15 either backwardly or forwardly of its normal position a degree corresponding to the rate of acceleration or deceleration of the car wheel, the maximum limit of relative movement of the inertia ring and the car wheel 15 being determined by the engagement of the lug 55 and one or the other of the lugs 56.

As previously indicated, the inner end of the leaf spring 42 is fixed to the tubular member 43. As will be apparent in Figs. 2 and 3, the inner end of the leaf spring is actually held in a metallic channel member 58 which is securely fitted into a recess in an insulating block or base 59 that is in turn secured to the tubular member 43 as by plurality of bolts 61.

Disposed on one side of the leaf spring 42 are four contact fingers 62, 63, 64 and 65 and on the opposite side of the leaf spring is a single contact finger 66. Each of the contact fingers is in the form of a bell-crank lever pivoted at the fulcrum thereof on a pin 68 of insulating material which is carried by and fixed in the insulating base 59, the contact fingers 62 to 65 being pivoted on the same pin 68 and separated from each other by insulating washer-like spacers 69. Each of the contact fingers is yieldingly urged pivotally toward the leaf spring 42, by a corresponding associated coil spring 71 which acts on one arm of the contact finger. An adjusting screw 72 is provided for each contact finger which is suitably carried by the insulating base 59 and screwed to a position so as to limit or stop the movement of the contact fingers in the direction of the leaf spring under the influence of the spring 71. The adjusting screws 72 for the contact fingers 62 to 65 are adjusted to different positions so that in the normal position thereof, the contact fingers 62 to 65 are spaced successively greater distances away from the leaf spring 42 in the order named. The leaf spring 42 is provided on opposite sides thereof with a plurality of contact discs 73 suitably disposed so as to register with and contact the outer end of corresponding contact fingers 62 to 65. Thus, when the inertia ring 37 shifts rotatively with respect to the car wheel in one direction from its normal position, the leaf spring 42 successively contacts the contact fingers 62 to 65 and, when the inertia ring 37 is shifted in the opposite direction from its normal position, the leaf spring 42 engages the contact finger 66.

The position of the contact fingers 62 to 66 and the strength of the flexible spring 42 may be such for example that when the car wheel 15 is rotatively decelerated at a rate corresponding to retardation of the car or train at a rate of 2.75 miles per hour per second, a rate of 3.75 miles per hour per second, a rate of 4.4 miles per hour per second and a rate of 5.0 miles per hour per second the leaf spring 42 successively engages the contact fingers 62, 63, 64 and 65, respectively. In a similar manner the position of the contact finger 66 and the strength of the spring 42 may be such that when the car wheel 15 accelerates rotatively at a rate corresponding to a rate of acceleration of the car of 2.75 miles per hour per second, the leaf spring 42 engages the contact finger 66.

As will be made apparent hereinafter, the leaf spring 42 and the contact fingers 62 to 66 accordingly constitute electrical switch means for effecting brake control operations hereinafter to be described. In order to provide a continuous electrical connection to the leaf spring 42 and to contact fingers 62 to 66, it is of course necessary to provide collector or slip rings 81, 82, 83, 84, 85 and 86 corresponding respectively thereto, secured side by side in insulated relation to the inner end of the tubular member 43, as by a plurality of bolts 87, and concentric to the axle 39.

The slip ring 81 is connected by a wire 88 to the channel member 58 in which the inner end of the leaf spring 42 is fixed. Each of the contact fingers 62 to 66 is connected to corresponding slip rings 82 to 86, respectively, by corresponding wires 89, the connection to the contact fingers being made through a terminal post or strap 91 that is engaged by one end of the coil spring 71 biasing the contact fingers to the normal position thereof.

A suitable brush holder 92 is provided for holding suitable brushes in contact with each individual slip ring 81 to 86, each individual brush having a wire connected thereto. The brush holder 92 is mounted stationarily in any suitable manner as on a bracket 94 secured as by screws 95 to a split ring 96 that is securely fastened to the non-rotatable axle 39. In order to protect and cover the parts of the rotary inertia device 16, a suitable casing 98 may be provided. As shown, such a casing may comprise two substantially semi-circular portions having cooperating flanges adapted to be secured together along a horizontal line at the level of the axis of the axle 39, the two portions of the casing being so formed as to closely surround and be secured at one end to the hub portion 38 of the car wheel 15 as by screws 99 and having an opening 101 at the opposite end thereof through which the axle 39 extends. The wires connected to the brushes of the brush holder 92 may be bound together in a suitable cable 102 which is conducted out of the casing 98 through the end opening 101.

Slip magnet valve 17 comprises a casing having a chamber 103 into which one section of the brake cylinder pipe 35 leading from the cut-off magnet valve 19 is connected, and a passage 104 to which the section of the brake cylinder pipe 35 leading from the brake cylinder is connected. Contained in the chamber 103 is a ball valve 105 which is normally unseated from an associated valve seat, formed on the casing, by the fluted stem 106 of a valve piston 107 which is normally urged upwardly into seated relation on an annular rib seat 108 by a coil spring 109 interposed between the casing and the back side of the valve piston 107. Formed in the casing is a suitable bore in which operates a valve piston 111, hereinafter designated a release valve, that is yieldingly urged into seated relation on an annular rib seat 112, to close an exhaust port 113 opening out of the passage 104, by a coil spring 114 interposed between the casing and the back side of the release valve 111.

The slip magnet valve 17 further comprises a magnet valve device having a double beat valve 116 and an electromagnet winding 117 that is effective, when energized, to shift the double beat valve from an upper seated position, to which it is normally yieldingly urged by a coil spring 120, to a lower seated position. The double beat valve 116 is effective to control the operation of the valve piston 107 and associated ball valve 105 as well as the release valve 111 in the manner to be hereinafter made apparent. The double beat valve 116 is contained in a chamber 118 and in its upper seated position closes an exhaust port 119 opening out of the chamber 118 and establishes communication from the passage 104 in the casing to the chambers at the back side of the valve piston 107 and the release valve 111 respectively through a branch passage 121, passage 122 and a branch passage 123.

With the magnet winding 117 deenergized and double beat valve 116 in its upper seated position, fluid under pressure may be supplied through the brake cylinder pipe 35 past the unseated ball valve 105, through the passage 104 and brake cylinder pipe 35 to the brake cylinder 14 without operation of the ball valve 105 or the release valve 111. It will be apparent that such is the case because with the double beat valve 116 in its upper seated position, fluid under pressure is supplied from the passage 104 to the chamber at the back side of the valve piston 107 and the chamber at the back side of the release valve 111, thus equalizing the pressures on opposite sides of the valve piston and release valve and rendering the associated coil springs 109 and 114 effective to maintain the valve piston 107 and release valve 111 in their normal positions respectively.

With fluid under pressure being supplied through the brake cylinder pipe 35 to the brake cylinder 14, energization of the magnet winding 117 causes the double beat valve 116 to be shifted to its lower seated position in which it cuts off the supply of fluid under pressure from the passage 104 to the chambers at the back side of the valve piston 107 and release valve 111 and at the same time exhausts fluid under pressure therefrom through the exhaust port 119. Thus, due to the unbalancing of the fluid pressures acting on the valve piston 107 and the release valve 111, the valve piston 107 is shifted downwardly into seated relation on an annular gasket seat 124 while the release valve 111 is shifted upwardly into engagement with an annular stop shoulder 125 projecting into the bore in which it operates.

When the valve piston 107 is shifted downwardly, the fluted stem 106 thereof is withdrawn from supporting relation under the ball valve 105, and the ball valve thus drops into seated relation on an associated seat to cut off and prevent the further supply of fluid under pressure therepast from the chamber 103 to the passage 104. Also, in shifting upwardly the release valve 111 is unseated from its annular rib seat 112 and accordingly fluid under pressure is exhausted from the passage 104 connected to the brake cylinder through the exhaust port 113. As will be made apparent hereinafter the exhaust port 113 is a relatively large port so that when the release valve 111 is unseated fluid under pressure is very rapidly vented from the brake cylinder 14.

The chambers at the back side of the valve piston 107 and release valve 111 are connected together through a passage 127 containing a one-way or check valve 128 shown as the ball type that is so arranged as to prevent the flow of fluid under pressure from the chamber at the back side of the release valve 111 to the chamber at the back side of the valve piston 107 but permitting reverse flow of fluid under pressure therepast. The purpose of the passage 127 and check valve 128 is to isolate the chamber at the back side of the valve piston 107 and prevent the supply of fluid under pressure thereto when the magnet winding 117 is subsequently deenergized. It will be apparent that when the magnet winding 117 is deenergized, communication is reestablished by the double beat valve 116 through which fluid under pressure is supplied from the passage 104 to the chamber at the back side of the release valve 111. Thus, when the magnet winding 117 is deenergized, the release valve 111 is promptly reseated to close the exhaust port 113. However, since the valve piston 107 is seated on its annular gasket seat 124 and since the ball check valve 128 prevents the supply of fluid under pressure therepast to the chamber at the back side of the valve piston 107, the fluid under pressure effective on the upper face of the valve piston 107 maintains it in seated position on the annular gasket seat 124 notwithstanding the deenergization of the magnet winding 177. Accordingly, the ball valve 105 is maintained seated to prevent the supply of fluid under pressure therepast to the brake cylinder from the brake cylinder pipe 35. The purpose of this operation will be made apparent hereinafter.

The slip magnet valve 17 further comprises an electromagnetically operated switch device which is actuated in response to the energization and deenergization of the magnet winding 117. As shown in Fig. 1, the switch device referred to comprises a contact member 131 which is carried in insulated relation on an armature or stem 132 associated with the magnet winding 117 and through which operation of the double beat valve 116 is effected. When the magnet winding 117 is deenergized, contact member 131 is shifted to a position out of contact with a pair of associated stationary contact members 133. When the magnet winding 117 is energized, the contact member 131 engages the contact members 133 and thereby establishes a holding circuit for maintaining the magnet winding 117 energized in the manner to be hereinafter described.

The reapplication magnet valve 18 comprises a casing having a suitable bore containing a valve piston 135, hereinafter referred to as the supply valve, that is operatively controlled by a pliot double beat valve 136 and its associated operating magnet winding 137. Supply valve 135 is normally urged downwardly into seated relation on an annular rib seat 138 by a coil spring 139 interposed between the casing and the back side of the supply valve 135. A branch of the brake cylinder pipe 35 is connected to and opens into a passage that in turns opens within the annular rib seat 138, and the space at the outer seated area of the supply valve is connected by a pipe and passage 141 to the supply reservoir 31. Supply reservoir 31 is connected to and charged with fluid under pressure from the brake pipe 11 through a branch pipe 142 containing a one-way or check valve 143 to prevent reflux of fluid under pressure from the reservoir to the brake pipe. When the supply valve 135 is unseated from the annular rib seat 138, communication is established from the reservoir pipe 141 to the brake cylinder pipe 35 and thus fluid under pressure is supplied from the supply reservoir 31 to the brake cylinder 14. A choke element 144 is provided for suitably controlling the rate of supply of fluid under pressure from the supply reservoir 31 to the brake cylinder 14.

The double beat valve 136 is contained in a chamber 145 that is constantly connected through a passage 146 to the chamber at the back side of the supply valve 135 and, when the double beat valve 136 is in its upper seated position, fluid under pressure may be supplied from a branch passage 147 of the passage 141 past the valve to the chamber at the back side of supply valve 135. The double beat valve 136 is normally urged to its upper seated position, in which it closes an exhaust port 148 opening out of the chamber 145, by a coil spring 149 interposed between the valve and the casing.

When the magnet winding 137 is energized, it actuates an armature or plunger 151 to shift the double beat valve 136 to its lower seated position so as to close the supply communication from the passage 147 to the chamber at the back side of the supply valve 135 and at the same time vent fluid under pressure from the chamber through the exhaust port 148. Since the pressure of the fluid in the supply reservoir 31 is constantly effective on the outer seated area of the supply valve 135, the exhaust of fluid under pressure from the back side thereof results in the upward shifting of the supply valve 135 and the consequent unseating thereof from the annular rib seat 138.

When the magnet winding 137 is deenergized, the double beat valve 136 is returned to its upper seated position closing the exhaust port 148 and reestablishing communication through which fluid under pressure is supplied to the chamber at the back side of supply valve 135, thus rapidly equalizing the pressure on the supply valve to cause the spring 139 to instantly reseat the supply valve on the annular rib seat 138.

It should be understood that the operation of the supply valve 135 in response to the operation of the double beat valve 136 is practically instantaneous and, therefore, that the supply valve 135 is actuated instantly in response to energization and deenergization of the magnet winding 137.

The reapplication magnet valve 18 further comprises a switch device including a contact member 153 carried in insulated relation on the armature 151 associated with the magnet winding 137 and a pair of spaced contact members 154 carried in insulated relation by the casing in the manner not shown. Contact members 153 and 154 are so arranged as to be in contact when the magnet winding 137 is deenergized and that the contact member 153 disengages the contact members 154 in response to the energization of the magnet winding 137. The switch device formed by the contact members 153 and 154 is connected in series relation with the switch device comprising contact members 131 and 133 of the slip magnet valve 17 and the purpose of this arrangement will be made apparent hereinafter.

Cut-off magnet valve 19 is similar, in part, to the silp magnet valve 17 and comprises a casing having a ball valve 155 that is normally held unseated by the fluted stem 156 of a valve piston 157, and a magnet valve device having a double beat valve 158 and associated operating magnet winding 159 for controlling the operation of the valve piston 157.

The valve piston 157 is normally urged upwardly into seated position on an annular rib seat 161 by a coil spring 162 interposed between the casing and the back side of the valve piston 157, and the fluted stem 156 of the valve piston 157 extends through a bore 163 into the chamber 164 containing the ball valve 155 and supports the valve in raised position away from its associated valve seat. The chamber 164 is connected by a section of the brake pipe 35 to the brake cylinder port of the brake controlling valve 12 and the bore 163 is connected by a passage 165 to another section of the brake pipe 35 that leads to the slip magnet valve 17. Thus, in the normal positions of the valve piston 157 and the ball valve 155, fluid under pressure may be supplied under the control of the brake controlling valve 12 through the brake cylinder pipe 35, past the ball valve 155 of cut-off magnet valve 19 to the section of the brake cylinder pipe 35 leading to the slip magnet valve 17.

The double beat valve 158 is contained in a chamber 166 which is connected through a passage 167 to the chamber at the back side of the valve piston 157. The double beat valve 158 is normally urged by a coil spring 171 to an upper seated position in which it closes an exhaust port 168 opening out of the chamber 166, and opens a supply port 169 connecting the chamber 166 and the passage 165. Thus, when the double beat valve 158 is in its upper seated position, the valve piston 157 is maintained in its upper position unseating the ball valve 155 due to the fact that fluid under pressure is supplied to the chamber at the back side of the valve piston so as to equalize the fluid pressures on the valve piston and cause the spring 162 to maintain the valve piston in its upper seated position.

When the magnet winding 159 is energized, it is effective through an armature or stem 172 to shift the double beat valve 158 to its lower seated position in which it closes the supply communication from the passage 165 to the chamber at the back side of the valve piston 157 and opens the exhaust port 168 to cause fluid under pressure to be rapidly exhausted from the chamber at the back side of the valve piston. With the venting of fluid under pressure from the chamber at the back side of the valve piston 157, the fluid pressure acting on the upper face of the valve piston becomes effective to overcome the spring 162 and shift the valve piston 157 downwardly to a limit position to cause seating of the ball valve 155, communication between the chamber 166 and chamber at the back side of the valve piston 157 being maintained open through the passage 167. When the magnet winding 159 is deenergized, the spring 171 promptly shifts the double beat valve 158 to its upper seated position closing the exhaust port 168 and opening the supply port 169, thereby promptly equalizing the fluid pressures on the valve piston 156 and causing the spring 162 to promptly return the valve piston upwardly to cause unseating of the ball valve 155.

The retardation switch 29 is illustrative of any suitable device responsive to the rate of retardation of the car or train. As shown, the retardation switch 26 comprises a casing in which is formed a chamber 175 containing a rolling member, such as the ball 176, which is relatively heavy. Ball 176 is adapted to roll on a smooth surface 177, formed on a wall of the casing, and is confined closely within a slot or opening 178 formed in a member 179 slidably mounted in the casing so as to shift the member 179 correspondingly therewith. A coil spring 181, interposed between the end wall of the casing and a collar or flange 182 on the member 179, yieldingly urges the slidable member and ball in the left-hand direction as seen in Fig. 1, the movement of the slidable member 179 in the left-hand direction being limited by the engagement of a shoulder formed thereon with the end wall of the casing. The slidable member 179 carries in insulated relation thereon a contact member 184 which is adapted to engage a pair of spaced stationary contact members 185 that are carried in insulated relation on the casing of the retardation switch in manner not shown, when the sliding member 179 is in its left-hand limit position.

The spring 181 is of such strength in relation to the weight of the ball 176 as to maintain the contact member 184 in engagement with its associated contact members 185 against the inertia force acting on the ball 176 due to the retardation of the car or train as long as the rate of retardation of the car or train does not exceed a certain rate, such as 2.25 miles per hour per second. When the rate of retardation of the car or train exceeds this certain rate, the force of inertia on the ball 176 is effective to overcome the spring 181 sufficiently to shift the sliding member 179 in the right-hand direction and thereby cause disengagement of the contact member 184 from its associated contact members 185.

The relays 23, 24 and 27 are of conventional design including an electromagnet winding and associated magnetic core with an armature adapted to be actuated in response to the energization to the electromagnet winding. As shown diagrammatically, the relay 23 comprises an electromagnet winding 23a effective when energized to actuate an armature and cause a contact member 23b carried in insulated relation thereon to engage a pair of stationary contact members 23c, the contact member 23b being biased out of contact with the contact members 23c by gravity or by other biasing means not shown upon deenergization of the magnet winding 23a.

In a similar manner the relay 27 comprises a magnet winding 27a, a contact member 27b carried in insulated relation on the armature actuated by the magnet winding, and a pair of stationary contact members 27c adapted to be engaged by the contact member 27b when the magnet winding 27a is energized and to be disengaged by the contact member 27b when the magnet winding is deenergized.

In a similar manner also, relay 24 comprises a magnet winding 24a, a pair of contact members 24b and 24c carried in insulated relation on the armature actuated by the winding, and two pairs of contact members 24d and 24e which are engaged by the contact members 24b and 24c respectively when the winding is energized. The contact members 24b and 24c are separated by gravity or other biasing means not shown from the associated pairs of contact members 24d and 24e when the magnet winding 24a is deenergized.

The emergency protection switch 28 is illustrative of any suitable pressure-operated switch. As shown diagrammatically, it may comprise a casing containing a piston 187 having a stem 188 on which is carried in insulated relation a contact member 189 which cooperates with a pair of stationary insulated contact members 191 carried by the casing in a manner not shown. At one side of the piston 187 is a chamber 192 which is constantly connected by a branch pipe 193 with brake pipe 11. At the opposite side of the piston 187 is a coil spring 194 which is interposed between the piston and the end wall of the casing in such manner as to be effective to shift the piston and the contact member 189 in a direction to separate the contact member 189 from its associated contact members 191 when the pressure in the brake pipe 11 and connected chamber 192 of the switch device reduces below a certain low pressure, such as 10 pounds per square inch.

Since the brake pipe 11 is normally charged to a pressure, such as ninety pounds per square inch as previously indicated, the piston 187 is normally shifted downwardly by the pressure of the fluid in the chamber 192 against the force of the spring 194 to effect engagement of the contact member 189 with contact members 191. Furthermore, due to the fact that the brake pipe pressure is never reduced to or below ten pounds per square inch during a service application of the brakes, contact member 189 of the emergency protection switch 28 is maintained in contact with its associated contact members 191 during a service application. During an emergency application of the brakes, however, the pressure in the brake pipe is reduced to atmospheric pressure and consequently contact member 189 is actuated out of contact with its associated contact members 191 only during an emergency application of the brakes. The purpose of the emergency protection switch 28 will be made apparent hereinafter.

The pressure switch 33 is similar in construction to the emergency protection switch 28 and therefore it is deemed unnecessary to describe its construction except to point out that corresponding parts in the two pressure switches are designated by the same reference numerals. The chamber 192 of the pressure switch 33 is connected by a branch pipe 196 to the brake cylinder pipe 35 at a point between the cut-off magnet valve 19 and the brake controlling valve 12 and is thus operated in response to the pressure of the fluid supplied to the brake cylinder 14. The coil spring 194 of the pressure switch 33 differs in strength from that of the spring 194 of the emergency protection switch 28 in that it permits movement of the piston to effect engagement of the contact member 189 with its associated contact members 191 when the pressure in the brake cylinder pipe 35 exceeds a pressure such as five pounds per square inch. It will thus be apparent that substantially at the time that the application of the brakes is initiated, contact member of the pressure 33 is actuated into contact with its associated contact members 191.

One of the contact members 191 of the pressure switch 33 is connected to one of the terminals, hereinafter referred to as the positive terminal, of the battery 32 by a wire 197 and the other contact member 191 has connected thereto a wire 198, hereinafter referred to as the battery wire. It will thus be seen when the contact member 189 of switch 33 engages its contact members 191, battery wire 198 is connected to the positive terminal of the battery 32; and also that unless the contact member 189 does engage its contact members 191, the supply of current from the battery 32 to the battery wire 198 is prevented. The purpose of this feature will be made apparent hereinafter.

Various electrical circuits are provided for effecting operation and control of the parts of the equipment above described. It is deemed unnecessary to specifically describe these circuits at this time, since they will be described in detail hereinafter in connection with an assumed operation of the equipment.

OPERATION OF EQUIPMENT (a) *Service application of the brakes*

Let it be assumed that the brake pipe 11 is charged to the normal pressure carried therein, say ninety pounds per square inch, so that the supply reservoir 31 is correspondingly charged, the emergency protection switch 28 is in its closed position and the brake controlling valve device 12 conditioned in its release position to vent fluid under pressure from the brake cylinder 14 through the brake cylinder pipe 35 and exhaust port of the brake controlling valve 12, the auxiliary reservoir 13 being at the same time charged to the pressure of the brake pipe. Let it be further assumed that the car or train of cars is travelling along the road at a substantially uniform speed, either under power or coasting, so that the inertia ring 37 of the rotary inertia device 16 associated with the car wheel 15 and also the inertia ring of the other rotary inertia devices associated with all the other wheels of the car or train are in the normal position thereof with respect to the associated wheels. With the car or train traveling at a uniform speed as assumed, the ball 176 of the retardation switch 20 has substantially no inertia forces acting thereon and consequently contact member 184 of the retardation switch is in contact with its associated contact members 185, as shown. Furthermore, since the pressure in the brake cylinder pipe 35 is at atmospheric pressure, the pressure switch 33 is in open position, as shown.

As will be made apparent hereinafter, the slip magnet valve 17, the reapplication magnet valve 18, the cut-off magnet valve 19 and the relays 23, 24 and 27 are correspondingly conditioned as shown in Fig. 1.

Now let it be assumed that the operator desires to effect a service application of the brakes and, after first cutting off the propulsion power if the power is on, effects a reduction in the pressure in the brake pipe 11 at a service rate and to an amount corresponding to the desired degree of the service application of the brakes.

The brake controlling valve 12 accordingly operates in response to the reduction of the pressure in the brake pipe 11 at a service rate to cause fluid under pressure to be supplied from the auxiliary reservoir 13 into the brake cylinder pipe 35 and then serially through pipe 35 past the unseated ball valve 155 of the cut-off magnet valve 19 and the unseated ball valve 105 of the slip magnet valve 17 to the brake cylinder 14 associated with the car wheel 15, to effect application of the brakes thereon. It will be understood that the supply of fluid under pressure to the brake cylinder 14, or to a plurality of parallel connected brake cylinders, effects application of the brakes on all of the wheels of the wheel truck having the car wheel 15. In a similar manner, it should be understood that fluid under pressure supplied into the brake cylinder pipe 35 also flows through a branch pipe 35a of the brake cylinder pipe to one or more brake cylinders associated with the car wheels of the wheel truck at the opposite end of a car, to effect application of the brakes thereon.

When the pressure in the auxiliary reservoir 13 is reduced by flow to the brake cylinders an amount corresponding to the amount of reduction in brake pipe pressure, the brake controlling valve 12 is operated in conventional manner to lap position to cut off the further supply of fluid under pressure from the auxiliary reservoir 13 to the brake cylinders so that the degree of pressure established in the brake cylinders corresponds to the amount of the reduction in brake pipe pressure.

Let it be assumed for example that the pressure established in the brake cylinders is twenty-five pounds per square inch. Thus, since the pressure in the brake cylinder pipe 35 is in excess of five pounds per square inch, the pressure switch 33 is operated to closed position connecting positive terminal of the battery 32 to the battery wire 198. Since, as previously explained, the rate of retardation of the car or train is not sufficient to cause opening of the retardation switch 26, closure of the pressure switch 33 establishes a circuit for energizing the relay 27, this circuit extending from the battery wire 198 through a branch wire 201, contact members 185 and 184 of the retardation switch 26, a wire 202, retardation wire 22, a branch wire 203, magnet winding 27a of relay 27 to the negative terminal of the battery 32 as through a ground connection in the manner indicated. Contact member 27b of relay 27 is accordingly actuated into engagement with its associated contact members 27c, which operation is without effect, however, unless the car wheel 15 or any of the car wheels of the same truck begin to slip. If none of the car wheels of the wheel truck having the wheel 15 slip, then no operation of the equipment occurs as a result of operation of relay 27, and the degree of the application of the brakes continues under the control of the operator in the conventional manner of automatic air brake equipment.

If the car wheel 15 begins to slip, however, due to the application of the brakes exceeding the adhesion between the wheel and the associated rail, then, due to the increase in the rate of rotative deceleration of the car wheel 15, the inertia ring 37 of the rotary inertia device 16 associated with the wheel 15 begins to shift relative to wheel 15 in a clockwise direction as seen in Fig. 1, assuming that the motion of the car or train is in the right-hand direction as indicated by the arrow above the wheel 15. When the rate of rotative deceleration of the car wheel 15 exceeds the rate corresponding to a rate of retardation of the car of 2.75 miles per hour per second, the leaf spring 42 engages the contact finger 62 and a circuit is thereby completed for energizing the magnet winding 117 of the slip magnet valve 17. This circuit extends from the battery wire 198 through a branch wire 205 having in series relation therein an inductance or choke coil 206 the purpose of which will be presently explained, leaf spring 42, contact finger 62, a wire 207, contact members 27b and 27c of relay 27, a wire 208, contact members 191 and 189 of the emergency protection switch 28, a wire 209, magnet winding 117 of the slip magnet valve 17, and back to the negative terminal of the battery 32 as through a ground connection in the manner shown. The inductance coil 206 momentarily delays the flow of current through the energizing circuit just described so as to prevent energization of the magnet winding 117 if the leaf spring 142 accidentally engages the contact finger 62 due to shock or jar to the cars. The provision of the choke coil 206 in the manner and for the purpose disclosed herein has been previously disclosed and claimed in my prior pending application Serial No. 248,654, previously mentioned.

Upon the energization of the magnet winding 117 of the slip magnet valve 17, the contact member 131 is actuated into contact with its associated contact members 133 to establish a holding circuit for maintaining the magnet winding 117 energized thereafter until such time as the holding circuit is interrupted in the manner to be hereinafter described. The holding circuit extends from the battery wire 198 through contact members 154 and 153 of the reapplication magnet valve 18, a wire 210, contact members 133 and 131 of the slip magnet valve 17, magnet winding 117 and back to the negative terminal of the battery 32 through the ground connection indicated. The purpose of the holding circuit will be made apparent presently.

As previously described in connection with the description of the slip magnet valve 17, the energization of the magnet winding 117 effects seating of the ball valve 105 to prevent the further supply of fluid under pressure therepast to the brake cylinder 14 and, at the same time, causes the release valve 111 to be unseated and vent fluid under pressure from the brake cylinder 14 through the exhaust port 113 at a rapid rate. Accordingly the brakes associated with all of the wheels of the wheel truck having the wheel 15 are correspondingly released even though the other wheels may not have begun to slip. The reason for releasing the brakes on all the wheels of a given truck simultaneously is that if one wheel begins to slip all the others may be dangerously close to the slipping point and consequently the instantaneous release of the brakes therefrom prevents the wheels from slipping.

Due to the rapid release of fluid under pressure from the brake cylinder 14 under the control of the slip magnet valve 17, the slipping wheel 15 does not decelerate to a locked-wheel or sliding condition but begins to accelerate back toward a speed corresponding to vehicle speed. The car wheel 15 accordingly tends to overspeed the inertia ring 37 of the associated rotary inertia device 16 and the inertia ring 37 accordingly shifts backwardly of its normal position an amount corresponding to the rate of rotative acceleration of the car wheel 15. The rate of rotative acceleration of a slipping car wheel back toward car speed is at least equal to if not greater than the rate of rotative deceleration of the wheel while slipping and, consequently, the engagement of the leaf spring 42 of the rotary inertia device with its associated contact finger 66 is effected, it being recalled that any rate of rotative acceleration in excess of 2.75 miles per hour per second is sufficient to cause the leaf spring to engage the contact finger 66.

Upon the engagement of the leaf spring 42 with its contact finger 66, a circuit is completed for energizing the magnet winding 137 of the reapplication magnet valve 18, this circuit extending from the battery wire 198 to the leaf spring 42 as previously described, then by way of the contact finger 66, a wire 211, magnet winding 137 of the reapplication magnet valve 18 and back to the negative terminal of the battery 32 as through a ground connection in the manner shown. As previously described in connection with the reapplication magnet valve 18, the energization of the magnet winding 137 thereof effects operation of the supply valve 135 to supply fluid under pressure from the supply reservoir 31 to the brake cylinder 14 and, at the same time, actuation of the contact member 153 out of engagement with its associated contact finger members 154. The separation of the contact member 153 from contact members 154 interrupts the holding circuit of the magnet winding 117 of the slip magnet valve 17, which is accordingly deenergized. The release valve 111 of the slip magnet valve 17 is thus promptly returned to seated position cutting off the further exhaust of fluid under pressure from the brake cylinder 14 through the exhaust port 113 substantially at the instant that the supply valve 135 of the reapplication magnet valve is unseated to supply fluid under pressure from the brake cylinder. Fluid under pressure is resupplied to the brake cylinder 14 at a rate determined by the flow area of the choke element 144 so that the pressure in the brake cylinder 14 is restored at a controlled rate.

It will be observed, as previously indicated, that notwithstanding deenergization of magnet winding 117, the valve piston 107 is maintained in its lower position so that the ball valve 105 is consequently maintained effective to prevent the further supply of fluid under pressure from the auxiliary reservoir 13 through the brake cylinder pipe 35 to the brake cylinder 14. The reason for maintaining the ball valve 105 in its seated position is to prevent the reduction of the pressure in the brake cylinders associated with the other wheel truck or trucks on the car by flow through the brake cylinder pipe 35 thus reducing the degree of application of the brakes associated with the other truck or trucks on which a wheel may not have slipped.

When the slipping car wheel 15 approaches car speed, the rate of rotative acceleration thereof decreases sufficiently to effect separation of the leaf spring 42 from the associated contact finger 66 of the rotary inertia device 16 and the circuit for energizing the magnet winding 137 of the reapplication magnet valve 18 is correspondingly interrupted. The supply valve 135 of the reapplication magnet valve 18 is thus instantly reseated to prevent the further supply of fluid under pressure from the supply reservoir 31 to the brake cylinder 14 in response to the deenergization of the magnet winding 137, and contact member 153 of the reapplication magnet valve is returned into contact with its associated contact members 154. Since the contact member 131 of the slip magnet valve 17 is disengaged from its associated contact members 133 upon deenergization of the magnet winding 117, the reengagement of the contact member 153 with its contact members 154 does not effect reenergization of the magnet winding 117.

It will thus be apparent that fluid under pressure is resupplied to the brake cylinders 14 from the supply reservoir 31 only as long as the rate of rotative acceleration of the slipping wheel 15 exceeds a rate such as 2.75 miles per hour per second in returning back toward car speed. The time that the car wheel 15 exceeds the rate of rotative acceleration of 2.75 miles per hour per second is sufficiently short and the size of the choke element 144 is suitably designed that the pressure restored in the brake cylinder 14 will not be sufficient to cause the wheels to again begin to slip. However, if for some reason, such as a change in the adhesion of the car wheels to the track rail, the wheel 15 should again begin to slip, the release valve 111 of the slip magnet valve 17 is again operated to rapidly reduce the pressure in the brake cylinder and the reapplication magnet valve 18 is subsequently operated to resupply pressure to the brake cylinder so that at no time is the car wheel 15 permitted to attain a locked-wheel or sliding state due to slipping.

It should be noted, however, that if for some reason or other the car wheel 15 should actually decelerate to a locked-wheel condition and slide, it can slide only momentarily because the release valve 111 of the slip magnet valve 117 is maintained in exhaust position until the slipping wheel positively accelerates at a rate in excess of 2.75 miles per hour per second. Thus, release of the fluid under pressure from the brake cylinder 14 is continued as long as necessary to assure the restoration of a slipping car wheel to a rolling state and prevent it from sliding more than momentarily, if at all.

(b) *Release of brakes following service application*

When the car or train has been brought to a complete stop by a service application of the brakes and the operator desires to release the brakes prior to again starting the car or train, he may release the brakes merely by restoring the pressure in the brake pipe 11 to its normal pressure. The brake controlling valve 12 accordingly operates in response to the restoration of the normal pressure in the brake pipe to vent fluid under pressure from the brake cylinder pipe 35 through the exhaust port thereof and, at the same time, to recharge the auxiliary reservoir 13 to the pressure carried in the brake pipe.

It will be apparent that the ball valve 105 of the slip magnet valve 17 unseats upward in response to the exhaust of fluid under pressure from the brake cylinder pipe 35 to permit the exhaust of fluid under pressure from the brake cylinder 14 through brake cylinder pipe 35 to atmosphere at the brake controlling valve 12. When the pressure acting on the upper face of the valve piston 107 of the slip magnet valve 17 reduces to a relatively low pressure, such as five pounds per square inch, the spring 109 becomes effective to shift the valve piston 107 upwardly to its normal position in which the stem 106 of the valve piston holds the ball valve 105 unseated in its normal position, thus restoring the slip magnet valve 17 to its normal condition.

When the pressure in the brake cylinder pipe 35 reduces below the low pressure such as five pounds per square inch, the pressure switch 33 is likewise shifted to its open position disconnecting the battery wire 198 from the positive terminal of the battery 32, thereby interrupting the circuit for energizing the magnet winding 27a of the relay 27 and causing the contact member 27b thereof to be shifted to its open position.

(c) *Emergency application of the brakes*

Let it now be assumed that with the brakes released and the equipment conditioned as shown in Fig. 1, and the train of cars traveling along the road under power at a substantially uniform high speed, the operator desires to effect an emergency application of the brakes. To effect an emergency application of the brakes, the operator first cuts off the propulsion power, if this power is on, and then effects a reduction of pressure in the brake pipe 11 at an emergency rate in the usual manner. The brake controlling valve 12 accordingly operates in response to the emergency reduction of pressure in the brake pipe to supply fluid under pressure from the auxiliary reservoir 13 through the brake cylinder pipe 35 to the brake cylinder 14 at an emergency rate.

When the pressure switch 33 closes, contact member 27b of relay 27 is actuated to closed position but is immediately returned to open position due to the opening of the retardation switch 20 when the rate of retardation of the car or train exceeds the rate of 2.25 miles per hour per second. Since the car or train is traveling at a high speed, the application of the brakes to a degree sufficient to cause a rate of retardation in excess of 2.25 miles per hour per second will be insufficient to cause slipping of the car wheel 15 and consequently the momentary closure of the contact member 27b of relay 27 is without effect since the leaf spring 42 of inertia device 16 associated with the car wheel 15 is not actuated into contact with the contact finger 62 before relay 27 is returned to its open position.

The emergency protection switch 28 is actuated to open position promptly in response to the emergency reduction of pressure in the brake pipe 11 and thus interrupts the circuit, previously traced, for energizing the magnet winding 117 of slip magnet valve 17. Accordingly undesired operation of the slip magnet valve to exhaust fluid under pressure from the brake cylinder 14 is prevented, should the relay 27 accidentally fail to open before the car wheels attain a rate of rotative deceleration corresponding to a car retardation of 2.75 miles per hour per second.

Accordingly, due to the emergency application of the brakes, the car wheels 15 continue to decelerate at an increasing rate, without any automatic control of the brake cylinder pressure, until the car or train attains a rate of retardation of 4.4 miles per hour per second, at which time the leaf spring 42 of each rotary inertia device 16 engages its associated contact finger 64. As will be made apparent presently, the prior engagement of the leaf spring 42 with its associated contact finger 63 is without immediate effect. Upon the engagement of the leaf spring 42 with its associated contact finger 64, a circuit is completed for energizing the magnet winding 23a of the relay 23 on every car throughout the train, this circuit extending from the battery wire 198 to the leaf spring 42, thence by way of the contact finger 64, a wire 215, synchronizing train wire 21, branch wire 216 on each car, magnet winding 23a of relay 23 on each car, and to the negative terminal of the battery 32 as through a ground connection in the manner shown.

By the time that any wheel of the car or train, assumed in the present instance to be the car wheel 15, attains a rate of rotative deceleration corresponding to a train retardation of 4.4 miles per hour per second, all other wheels of the car or train will have attained at least a rate of rotative deceleration corresponding to a car retardation of 3.75 miles per hour per second sufficient to effect the engagement of leaf spring 42 of each inertia device 16 with its associated contact finger 63. Accordingly, when the relay 23 on a car is energized due to energization of the synchronizing train wire 21, the actuation of the contact member 23b thereof to closed position completes a circuit for energizing the magnet winding 24a of the so-called stick relay 24. This circuit extends (see Fig. 1) from the battery wire 198 on the car to the leaf spring 42 of every rotary inertia device 16 as previously traced, thence by way of the contact finger 63, a wire 218, contact members 23c and 23b of relay 23, a wire 219, branch wire 221, magnet winding 24a, and to the negative terminal of the battery 32 on the corresponding car as through a ground connection in the manner shown in Fig. 1.

The actuation of the contact member 24b of relay 24 on each car into closed position in response to the energization of the magnet winding 24a establishes a holding circuit for maintaining the magnet winding 24a energized thereafter independently of the corresponding relay 23, the circuit extending from battery wire 198 through the rotary inertia device 16 to the wire 218 as previously traced, thence by a branch wire 222, contact members 24d and 24b of relay 24, wires 219 and 221, magnet winding 24a and to the negative terminal of the battery 32 through the ground connection shown.

The engagement of the contact member 24c with its associated contact members 24e in response to energization of the magnet winding 24a of relay 24 completes a circuit for energizing the magnet winding 159 of the cut-off magnet valve 19. This circuit extends from the battery wire 198 through a branch wire 223, contact members 24e and 24c, a wire 224, magnet winding 159 of the cut-off magnet valve 19 and to the negative terminal of the battery 32 through the ground connection indicated.

As previously explained in connection with the description of the cut-off magnet valve 19, the energization of the magnet winding 159 causes the ball valve 155 to be seated and prevent the further supply of fluid under pressure therepast to the brake cylinder 14 through the brake cylinder pipe 35.

It should be understood that, as indicated in Fig. 1, all the rotary inertia devices 16 on the car or train are so connected that when any wheel of the car or train first reaches a rate of rotative deceleration corresponding to a car retardation of 4.4 miles per hour per second, the synchronizing train wire 21 is energized just as described in connection with the rotary inertia device 16 associated with the car wheel 15. Accordingly, whenever any wheel on the car or train attains a rate of rotative deceleration corresponding to a car retardation of 4.4 miles per hour per second, the ball valve 155 of the cut-off magnet valve 19 on each car is actuated to seated position to prevent the further supply of fluid under pressure to the brake cylinders on the corresponding car.

As previously explained, my present brake control equipment is adapted to be employed particularly in connection with wheel brake devices the rubbing parts of which have a so-called friction fading characteristic that results in a reduction of the coefficient of friction thereof with the continued application of the brakes. Thus, since further increase of the pressure in the brake cylinders 14 on each and every car is prevented due to the seating of the ball valve 155 of the cut-off magnet valve 19 on each car, no car wheel can thereafter decelerate rotatively at a rate in excess of one corresponding to the car rate of retardation of 4.4 miles per hour per second, unless the wheel slips. Assuming however that none of the wheels begin to slip, the brake application will be continued at a degree determined by the then attained brake cylinder pressure, diminishing accordingly as the coefficient of friction of the rubbing parts of the brake devices diminishes due to the friction-fading characteristic of the rubbing parts of the brake devices.

When the rate of rotative retardation of the car wheels decreases from the attained maximum of 4.4 miles per hour per second, sufficiently that the leaf spring 42 of the rotary inertia device 16 associated with every car wheel disengages its corresponding contact finger 64, the synchronizing train wire 21 is deenergized and consequently the so-called synchronizing relay 23 on every car is deenergized. As previously indicated, however, the relay 24 has established its own holding circuit and continues to remain energized independently of the deenergization of the relay 23 as long as the rate of rotative deceleration of the car wheels on the corresponding car exceeds a rate corresponding to car retardation of 3.75 miles per hour per second.

The rotary inertia devices 16 of the car wheels on each individual car are so connected in parallel relation that as long as the leaf spring 42 of any of the rotary inertia devices on the same car engages its corresponding contact finger 63, the relay 24 for that car remains energized. Thus, upon the separation of the leaf spring 42 of the rotary inertia device 16 associated with the last car wheel to decrease below a rate of rotative deceleration of 3.75 miles per hour per second, the circuit for energizing the relay 24 is interrupted and consequently the contact members 24b and 24c thereof are restored to open position. The opening of the contact member 24b interrupts the holding circuit for the relay 24, thereby again necessitating a rotative deceleration of a car wheel on that car at a rate corresponding to a car rate of retardation of 4.4 miles per hour per second before relay 24 can be again energized. The opening of the contact member 24c interrupts the circuit for energizing the magnet winding 159 of the cut-off magnet valve 19. This results in the operation of the valve piston 157 to unseat the ball valve 155 to permit the further supply of fluid under pressure through the brake cylinder pipe 35 to the brake cylinder 14 to further increase the pressure in the brake cylinders on the car and thereby compensate for the decreased braking effort caused by the friction-fading characteristic of the wheel brake devices.

When the car wheels again begin to decelerate rotatively at a rate in excess of a car retardation of 4.4 miles per hour per second, the relay 24 is again energized to cause operation of the cut-off magnet valve 19. This operation is repeated as often as it is necessary during any one application of the brakes to compensate for the decrease in braking effort caused by the friction-fading characteristic of the wheel brake devices. Accordingly, it will be seen that the cut-off magnet valves 19 on every car are automatically controlled by the rotary inertia devices 16 of any of the car wheels throughout the train as well as by any of the rotary inertia devices on the corresponding car to limit and regulate the pressure in the brake cylinder so that a substantially uniform rate of retardation of the car or train is effected. It will be apparent that since the cut-off magnet valves 19 are operated when the car wheels attain a rate of rotative deceleration corresponding to a car retardation of 4.4 miles per hour per second, the average rate of retardation of the car or train will be somewhere between the 3.75 miles per hour per second and the 4.4 miles per hour per second which are the lower and upper limits established by the rotary inertia devices.

It should now be apparent that if an individual car wheel such as the car wheel 15, begins to decelerate rotatively at a rate corresponding to car retardation in excess of the upper limit of 4.4 miles per hour per second, this is an indication that the wheel is beginning to slip. Thus, if during the application of the brakes, an individual car wheel 15 should begin to decelerate rotatively at a car rate of retardation of 5 miles per hour per second, the leaf spring 42 of the associated rotary inertia device 16 engages the contact member 65 and thereby completes a circuit for energizing the magnet winding 117 of the slip magnet valve 17. The slip magnet valve 17 is thus operated, as previously described for a service application of the brakes, to cut off the further supply of fluid under pressure through the brake cylinder pipe 35 to the brake cylinder 14 and rapidly vent fluid under pressure from the brake cylinder or cylinders applying the brakes on the wheel truck having the slipping wheel. In a similar manner also to that described for a service application, the subsequent rotative acceleration of the wheels back toward car speed in response to the release of the brakes and the consequent engagement of leaf spring 42 of the associated rotary inertia device 16 with its contact finger 66 effects operation of the reapplication magnet valve 18 to resupply fluid under pressure to the brake cylinder 14 from the supply reservoir 31.

It will be apparent that, if an individual car wheel on a particular car begins to slip before the car wheels of other cars have attained a rate of rotative deceleration in excess of 3.75 miles per hour per second, then the energization of the synchronizing train wire 21 due to the engagement of the leaf spring 42 with the contact finger 64 of the rotary inertia device associated with the slipping wheel will result in the energization of the synchronizing relay 23 on all cars; but no operation of the cut-off magnet valve 19 on any car other than the car having the slipping wheel will occur because it is necessary for the leaf spring 42 of at least one rotary inertia device on each car to engage its associated contact finger 63 before the relay 24 can be energized to cause operation of the cut-off magnet valve 19 on that car. Thus, fluid under pressure continues to be supplied during an emergency application to the brake cylinders on cars having no slipping wheels until at least a rate of retardation of the wheels on the car corresponding to a car retardation of 3.75 miles per hour per second is attained notwithstanding that a wheel may have slipped on another car prior to that time.

After a slipping wheel returns to a rotative speed corresponding to car speed, the pressure reestablished in the brake cylinder 14 associated with that wheel and the other wheels of the same wheel truck will not be further increased during the duration of the application of the brakes, for the reason that the ball valve 105 of the slip magnet valve 17 remains seated to prevent the supply of fluid under pressure through the brake cylinder pipe 35 to the brake cylinder. In the event that slipping of a particular wheel again occurs, the slip magnet valve 17 and the reapplication magnet valve 18 associated therewith are again operated in sequence in the manner previously described.

It should be understood that the particular rates of car retardation referred to herein at which the leaf spring 42 of a rotary inertia device engages the associated contact fingers 62 to 66, are purely illustrative. Thus, it should be understood that the regulation of the rate of rotative retardation of the car wheels to a rate between the lower and upper limits of 3.75 and 4.4 miles per hour per second is merely illustrative of the maximum rate of rotative retardation of a car wheel that can be effected within the limit of the adhesion between the car wheels and the track rails.

If the adhesion between the car wheels and the track rails is relatively high, then slipping of the car wheels should not occur because the braking force on the car wheels is limited to a value so as not to exceed the limit of the adhesions between the wheel and the rail.

If the adhesion between the car wheels and the rails is relatively low, then the car wheels may slip since the braking force may be such as to exceed the adhesion between the car wheels and the rails. However, in such case the rotary inertia devices 16 function to prevent actual sliding of the car wheels.

It will thus be apparent that the rotary inertia devices 16 function to control the cut-off magnet valves 19 on the cars in such manner as to regulate the pressure in the brake cylinders to a degree so as to produce a maximum rate of retardation consistent with the adhesion between the car wheels and the rails. Since a relatively high adhesion between the car wheels and the rails can be dependably realized a major portion of the time, it will be apparent that the brake control equipment functions to bring a car or train to a complete stop from a high speed in as short a stopping distance as is possible without the employment of extraneous or off-the-wheel brake devices such as track brake devices.

After a car or train has been brought to a complete stop, the inertia ring 37 of each rotary inertia device 16 is restored to its normal position and accordingly the leaf spring 42 thereof disengages all of its associated contact fingers 62 to 65. Thus, due to the separation of the leaf spring 42 from the contact fingers 63 and 64, the cut-off magnet valve 19 on every car is automatically restored to its normal position in which the ball valve 155 is held unseated. If the supply pressure delivered to the cut-off valve 19 under the control of the brake controlling valve 12 is still in excess of the attained pressure in the brake cylinder, the pressure in the brake cylinder will accordingly build up to a maximum pressure of equalization with the pressure in the auxiliary reservoir 13. In the case of wheel trucks having wheels which slipped during the application, the ball valve 105 of the slip magnet 17 remains seated and thus the pressure in the brake cylinders for such wheel trucks is not automatically built up to a maximum pressure of equalization when the car or train comes to a stop.

When a car or train comes to a complete stop, the retardation switch 20 is returned to its closed position and, since the pressure switch 33 is closed, the circuit is again completed for energizing relay 27 to cause its contact member 27b to be actuated to close position. The emergency protection switch 28 is in open position, however, and thus the magnet winding 117 of the slip magnet valve 17 cannot be energized as a result of closure of relay 27. Consequently, the pressure restored in the brake cylinder 14 by operation of the reapplication magnet valve 18 is retained therein when the car or train comes to a stop.

(d) *Release of the brakes following emergency application of the brakes*

To effect a release of the brakes following an emergency application of the brakes and prior to again starting the car or train, the operator restores the pressure in the brake pipe 11 to its normal pressure by operation of the manually operated brake valve (not shown) in well understood manner. The brake controlling valve 12 operates in response to the restoration of the normal pressure in the brake pipe 11 to recharge auxiliary reservoir 13 and exhaust fluid under pressure from the brake cylinder 14 through the brake cylinder pipe 35 and to atmosphere at the brake controlling valve, in the same manner as previously described for a release following a service application of the brakes.

MODIFICATION SHOWN IN FIG. 4

Referring to Fig. 4, a cut-off magnet valve 19a is shown which differs from cut-off magnet valve 19 in having a restricted port 250 connecting the chamber 164 and the passage 165 in by-passing relation to the ball valve 155.

When employing cut-off magnet valve 19a, fluid under pressure is supplied at a restricted rate to the brake cylinders of a corresponding car when the ball valve 155 of the cut-off magnet valve 19a is seated. Thus, instead of cutting off the supply to the brake cylinders altogether when the rate of rotative deceleration of the car wheels exceeds 4.4 miles per hour per second and permitting them to thereafter reduce to 3.75 miles per hour per second before resupplying fluid under pressure to the brake cylinders, the restricted port 250 enables a continued restricted flow to the brake cylinder so as to maintain a higher average rate of retardation of the wheels within the lower and upper limits of 3.75 and 4.4 miles per hour per second determined by the rotary inertia devices 16.

The size of the restricted port 250 is determined according to the rate at which the coefficient of friction of the rubbing parts of the wheel brake devices fades so as to compensate for the reduction in the braking force due to the reduction of the coefficient of friction.

It should be apparent that where the rate of fading of the coefficient of friction is not uniform and is erratic in its variation, the provision of cut-off magnet valves 19a is not desirable because in such case whether or not the friction fading occurs, fluid under pressure will be continuously supplied at a restricted rate through the port 250 of the cut-off magnet valve thus increasing the likelihood of slipping of the car wheels.

SUMMARY

Summarizing, it will be seen that I have provided a brake control equipment for vehicles such as railway cars and trains employing wheel brake devices wherein the rubbing parts of the brake devices possess a friction-fading characteristic, as distinguished from the usual friction-increasing characteristic.

The brake control equipment includes suitable brake cylinders for applying the brakes to the wheels and a conventional pneumatic equipment for controlling the supply and release of fluid under pressure to and from the brake cylinders. According to my invention, a rotary inertia device is associated with each individually mounted and rotatable wheel and is operatively responsive in accordance with the rate of rotative deceleration or acceleration of the corresponding wheel. A retardation switch is also provided which is operative in response to the rate of retardation of the car or train.

During a service application of the brakes, the retardation switch is always so conditioned, due to the fact that the retardation of the car or train never exceeds a certain rate during a service application, as to render the rotary inertia devices associated with the individual car wheels effective when any one wheel of a truck begins to decelerate rotatively at a rate slightly greater than a certain low rate of train retardation to rapidly release fluid under pressure from the brake cylinders applying the brakes on a wheel truck on which a wheel slips and then to resupply fluid under pressure automatically to those brake cylinders to reapply the brakes, in response to the positive acceleration of the slipping car wheel or wheels back toward car speed.

During an emergency application of the brakes, the retardation switch is conditioned in response to the higher rate of retardation of the car or train to render the rotary inertia devices ineffective at the lower rate of rotative retardation of the car wheels effective during a service application but effective at a higher rate of rotative retardation to rapidly release fluid under pressure from the brake cylinders on the truck having the slipping wheel or wheels and then to automatically resupply fluid under pressure to those brake cylinders upon positive acceleration of the slipping car wheels back toward car speed.

The rotary inertia devices associated with the individual wheels are furthermore adapted to so control a cut-off magnet valve device controlling the supply of fluid under pressure to the brake cylinders during an emergency application of the brakes as to limit the normal rate of retardation of non-slipping car wheels to some rate between an upper and a lower limit so selected as not to exceed the adhesion between the car wheels and the track rails. The rate at which the rotary inertia devices recognize slipping of wheels during an emergency application of the brakes is slightly in excess of the rate of rotative retardation to which the wheels are normally limited.

It will thus be apparent that the brake control equipment of my present invention is based on the novel principle that rotative deceleration of the car wheels at a rate in excess of the car or train retardation is indicative of a slipping condition thereof.

It will be seen that individually rotatable car wheels will decelerate at a very fast rate once it begins to slip and will attain a locked-wheel or sliding condition unless the rotary inertia devices respond quickly enough so as to relieve the brake cylinder pressure and thus release the brakes sufficiently rapidly to start the wheel accelerating back toward car speed prior to attaining the locked-wheel condition. By providing an arrangement in which the rotary inertia devices operate to release and reapply the brakes at different rates of rotative retardation of the car wheels depending upon the rate of retardation of the car or train, the requisite sensitivity to the initiation of slip of the car wheels is obtained.

It should be understood that the brake control arrangement including the rotary inertia devices 16, slip magnet valve 17, reapplication magnet valve 18 and retardation switch 20, may be employed with any type of wheel brake device whether of the friction-fading type or friction-increasing type.

In regulating the rate of retardation of the car or train during an emergency application of the brakes, the rotary inertia devices function to cause cut-off of the supply of fluid under pressure to the brake cylinders for operating wheel brakes having the friction-fading characteristic at a point as high as possible consistent with the adhesion between the car wheels and the track rails and then maintain the supply cut off until, due to the friction-fading, the rate of retardation of the car or train reduces below a lower limit, whereupon fluid under pressure is resupplied to the brake cylinder to compensate for the friction-fading.

A modified cut-off magnet valve is disclosed wherein the supply of fluid under pressure to the brake cylinder is not cut off altogether at the upper limit of retardation determined by the rotary inertia devices but continues to be supplied at a restricted rate designed to compensate for the friction-fading and thus maintain a higher average rate of retardation. If the friction-fading characteristic is not such as to reduce at a uniform rate and is erratic, this modified cut-off magnet valve should not be used since it is apt to result in excessive wheel slipping.

It will be apparent that the brake control equipment disclosed herein is not limited to cars or trains having individually rotatable wheels but may be employed as well on cars of the more conventional type having a unit assembly of a pair of wheels fixed to an axle. In this case, only one rotary inertia device is required per pair of wheels since the two wheels engaging the opposite rails rotate together. Furthermore, if desired, other types of rotary inertia devices 16 associated with the car wheels or with the axles of the rotatable type may be employed as long as they are adapted to perform the functions of the rotary inertia devices disclosed herein.

While I have illustrated and described a specific embodiment of my invention, it should be apparent that various omissions, additions or modifications may be made therein without departing from the spirit of my invention. It is accordingly not my intention to limit the scope of my invention except as it is necessitated by the scope of the prior art.

Having now described my invention, what I claim as new and desire to secure by Letters Patent, is:

1. A vehicle brake control equipment comprising means for effecting application and release of the brakes on the vehicle, means operative to cause a rapid release of the brakes on a given vehicle wheel, means responsive to the rate of rotative deceleration of the given wheel for effecting operation of the rapid release means at a certain rate of rotative deceleration of the wheel or at a certain higher rate of rotative deceleration of the wheel, and means responsive to the rate of retardation of the vehicle for determining at which of said rates of rotative retardation of the wheel said responsive means will cause operation of the rapid release means.

2. A vehicle brake control equipment comprising means for effecting application and release of the brakes on the vehicle, means operative to cause rapid release of the brakes on a given vehicle wheel, means responsive to the rate of rotative deceleration of the said given wheel for effecting operation of said rapid release means at a certain rate of rotative deceleration or at a certain higher rate of rotative retardation of the given wheel, and means responsive to the rate of retardation of the vehicle effective when the rate of retardation of the vehicle is below a certain rate for causing the last said means to cause operation of the rapid release means at the said certain rate of rotative deceleration of the given wheel and when the rate of retardation of the vehicle exceeds said certain rate of vehicle retardation to cause the last said means to effect operation of the rapid release means only at the said certain higher rate of rotative deceleration of the given wheel.

3. A vehicle brake control equipment comprising means for effecting a service application or an emergency application of the brakes on all wheels of the vehicle, means operative to cause rapid release of the brakes on a given wheel, means responsive to the rate of rotative deceleration of the said given wheel for effecting operation of the rapid release means at a certain rate of rotative deceleration of the given wheel or at a certain higher rate of rotative deceleration of the given wheel, and means for causing the last said means to effect operation of the rapid release means at the said certain rate of rotative deceleration of the wheel during a service application and effective to cause operation of the rapid release means at only the said certain higher rate of rotative deceleration of the wheel during an emergency application of the brakes.

4. A vehicle brake control equipment comprising means for effecting application and release of the brakes on all the wheels of the vehicle, means operative to cause rapid release of the brakes on a given wheel, means responsive to the rate of rotative deceleration of the given wheel for effecting operation of the said rapid release means whenever the rate of rotative deceleration of the given wheel exceeds a certain rate, and means effective during an emergency application of the brakes for preventing the last said means from causing operation of the rapid release means except when the given wheel decelerates rotatively at a rate in excess of a second certain rate higher than the first said certain rate.

5. A vehicle brake control equipment comprising a brake pipe normally charged with fluid under pressure, means operative in response to a service rate of reduction of brake pipe pressure to effect a service application of the brakes on all wheels of the vehicle and in response to an emergency reduction of the pressure in the brake pipe to effect an emergency application of the brakes on all the wheels of the vehicle, means operative to cause rapid release of the brakes on a given vehicle wheel, means operatively responsive to the rate of rotative deceleration of the given wheel for effecting operation of the rapid release means at a certain rate of rotative deceleration of the given wheel or at a certain higher rate of rotative deceleration of the given wheel, and means controlled by the pressure in the brake pipe and responsive only to an emergency reduction of the pressure in the brake pipe for preventing the last said means from causing operation of the said rapid release means at the said certain rate of rotative deceleration of the given wheel.

6. A vehicle brake control equipment comprising means for effecting application and release of the brakes on all the wheels of the vehicle, means operative to cause rapid release of the brakes on the said given wheel, means responsive to the rate of rotative deceleration of the given wheel to cause operation of the rapid release means when the rate of rotative deceleration of the given wheel exceeds a certain rate or a certain higher rate, means responsive to the rate of retardation of the vehicle for causing the wheel responsive means to effect operation of the said rapid release means when the given wheel exceeds said certain rate as long as the rate of retardation of the vehicle does not exceed a certain rate and effective to cause the said wheel responsive means to effect operation of the rapid release means only when the wheel exceeds the said certain higher rate of rotative deceleration while the rate of retardation of the vehicle exceeds said certain rate, and means controlled by the wheel responsive means for regulating the degree of application of the brakes on the said given wheel so as to cause the rotative deceleration of the given wheel at a substantially constant rate lower than the said certain higher rate.

7. A vehicle brake control equipment comprising means for effecting application and release of the brakes on all the wheels of the vehicle, means operative to cause rapid release of the brakes on the said given wheel, means responsive to the rate of rotative deceleration of the given wheel to cause operation of the rapid release means when the rate of rotative deceleration of the given wheel exceeds a certain rate or a certain higher rate, means responsive to the rate of retardation of the vehicle for causing the wheel responsive means to effect operation of the said rapid release means when the given wheel exceeds said certain rate as long as the rate of retardation of the vehicle does not exceed a certain rate and effective to cause the said wheel responsive means to effect operation of the rapid release means only when the wheel exceeds the said certain higher rate of rotative deceleration while the rate of retardation of the vehicle exceeds said certain rate, and means controlled by the wheel responsive means for regulating the degree of application of the brakes on the said given wheel so as to cause the rotative deceleration of the given wheel at a substantially constant rate between the said certain rate and said certain higher rate of rotative deceleration.

8. In a brake control equipment for vehicles having brake devices wherein the rubbing parts possess a friction-fading characteristic, means for initiating a continually increasing degree of application of the brakes on all wheels of the vehicle, a plurality of means associated individually with a corresponding plurality of the vehicle wheels and operatively responsive to the rate of rotative deceleration of the corresponding wheel, means operative under the control of any one of the said plurality of means when the associated wheel decelerates rotatively at a rate in excess of a certain rate for preventing further increase in the degree of application of the brakes on all the plurality of wheels, and means effective, once the last said means is operated, to prevent an increase in the degree of application notwithstanding a reduction in the rate of rotative deceleration of the car wheel below said certain rate until all of said plurality of wheels decelerate rotatively at a rate less than a second certain rate which is a certain amount lower than the first said certain rate.

9. A vehicle brake control equipment comprising means for effecting application and release of the brakes on all the wheels of the vehicle, means operative to effect a rapid release of the brakes on a given wheel, means for effecting reapplication of the brakes on the given wheel independently of the first said means, a rotary inertia device associated with the said given wheel effective in response to the rotative deceleration of the given wheel at a rate in excess of a certain rate or at a rate in excess of a certain higher rate to cause operation of the said rapid release means and effective in response to the rotative acceleration of the vehicle wheel at a rate in excess of a certain rate for effecting operation of said brake reapplying means, and means operatively responsive according to the rate of retardation of the vehicle for preventing said rotary inertia means from being effective to cause operation of the rapid release means except when the rate of rotative deceleration of the given wheel exceeds said certain higher rate as long as the rate of retardation of the vehicle exceeds a certain rate.

10. In a brake control equipment for vehicles having wheel brake devices wherein the rubbing parts possess a friction-fading characteristic, means for initiating a continually increasing degree of application of the brakes on all wheels of the vehicle, individual means for each wheel of the vehicle operatively responsive to the rate of rotative deceleration of the corresponding wheel, means normally conditioned to permit the increase in the degree of application of the brakes on the wheels of the vehicle at a relatively rapid rate and operative under the control of any of the individual means when the corresponding wheel decelerates rotatively at a rate in excess of a certain rate for preventing further increase in the degree of application of the brakes except at a relatively slow rate, and means for preventing the operation of the last said means to thereafter permit an increase in the degree of application of the brakes at the said relatively rapid rate until the wheel decelerates rotatively at a rate below a second certain rate that is a predetermined uniform amount below the said certain rate.

JOSEPH C. McCUNE.